3,682,873
Patented Aug. 8, 1972

3,682,873
PROCESS FOR PRODUCING SPHERICAL STYRENE-ACRYLONITRILE COPOLYMER PARTICLES OF CONTROLLED PARTICLE DIAMETER
Yukio Hozumi, Yuzo Sonoyama, and Masaru Omata, Sakai, Japan, assignors to Daicel Ltd., Osaka, Japan
No Drawing. Filed Sept. 11, 1970, Ser. No. 71,343
Claims priority, application Japan, Sept. 17, 1969, 44/73,747
Int. Cl. C08f 15/04, 15/22
U.S. Cl. 260—85.5                                     12 Claims

ABSTRACT OF THE DISCLOSURE

A process for preparing styrene-acrylonitrile copolymers in which a stirred mixture of styrene-acrylonitrile is preliminarily polymerized in bulk in the presence of catalyst until the conversion reaches to a value from 10 to 40% and then the reacted mixture is suspended and dispersed in an aqueous medium containing suspension stabilizer and the remaining monomer is substantially completely polymerized in the state of an aqueous suspension to form genuinely spherical copolymer particles having increased diameter which are useful for the preparation of a porous product by point-to-point adhesion of spherical particles.

---

The present invention relates to a process for producing a styrene-acrylonitrile copolymer by which the size of genuinely spherical particles of styrene-acrylonitrile copolymer is readily controlled. More particularly, it relates to a process for preparing genuinely spherical particles of copolymer of styrene-acrylonitrile whose average particle diameter is considerably greater than the diameters of conventional spherical styrene-acrylonitrile copolymers that are prepared by hitherto known processes.

Recently, rigid porous products made of plastics have become available for the industrial purposes such as dispersion, fluidization, aeration, filtration and separation. Such porous products are usually prepared by point-to-point adhesion of spherical particles made of plastics at higher temperature. The ease of sintering, resistance to air permeation, mechanical strength, chemical properties and physical characteristics of such porous products are not uniform in accordance with the kinds of the plastics employed and with the sizes of particles used. There are many types of copolymers capable of use for such purposes such as styrene-acrylonitrile copolymer, polyethylene, polypropylene, nylon, polyacetal, polystyrene, ABS, polymethyl methacrylate, etc. Among them, styrene-acrylonitrile copolymer is particularly suited for the purpose so that the demand for styrene-acrylonitrile porous products is rapidly expanding. Styrene-acrylonitrile is much superior for this purpose to other types of plastics and is almost ideal from the following standpoints:

(1) the temperature range of sintering is relatively wide so that the molding or shaping is easy to carry out,
(2) its mechanical strength is great,
(3) it has excellent resistance to chemicals and oils,
(4) its thermal resistance is fairly good, and
(5) the particles can be strongly bonded with one another by adhesion.

However, a further requirement has appeared recently, namely, that the particle size of the spherical copolymer particles should be greater as well as more uniform. This requirement is imposed in order to prevent choking and thus to facilitate the daily operation of the user when the porous product is used as the final product.

It is well-known that genuinely spherical particles of styrene-acrylonitrile copolymer can be prepared by means of the suspension polymerization technique. Usually suspension polymerization is carried out by dispersing a homogeneous liquid mixture composed of one or more kinds of polymerizable liquid monomers, catalyst for polymerization, chain-transfer agent, suspension-stabilizer (dispersing agent) and other additives, and then carrying out polymerization at a conventional temperature range. But it is often recognized that the control of particle size in such a procedure is difficult particularly on an industrial scale. This difficulty is derived from the fact that it is necessary, in order to enlarge the particle size of the polymer, either to slow down the stirring, to reduce the amount of suspension-stabilizer or employ larger granules of inorganic suspension stabilizer. Each of such countermeasures necessarily results in the instabilization of the suspension of monomer or monomer-polymer mixture (nearly liquid) at the initial stages of polymerization and thereby causes a risk of coagulation of particles.

In order to overcome the above-mentioned disadvantage, British Pat. 609,692 has provided a process for obtaining homogeneous size of beads of styrenic polymers, wherein a monomer containing 40% by weight or more of polymer is cut into homogeneously sized chips by means of a mechanical cutting operation, after which the chips are dispersed into a hot inert liquid to complete the polymerization. But such a process is accompanied with a variety of disadvantages. First of all, it is difficult to feed additional styrene or to remove acrylonitrile during the course of polymerization, which is necessary for preventing a change of the polymer composition during the preparation of styrene-acrylonitrile copolymer due to changes of the polymerization degree. Secondly, the genuinely spherical copolymer particles desired for the purpose of making a porous product are difficult to obtain. Furthermore, the process requires a bulk polymerization system up to high conversion which will make the apparatus complicated for the sake of heat-removal and the mechanical cutting process requires special equipment.

As seen above, a process for controlling the size of styrene-acrylonitrile copolymer by means of a simple procedure has not been developed yet.

The present invention, in order to overcome the said disadvantages, comprises a preliminary bulk polymerization process in which a stirred mixture of styrene-acrylonitrile is polymerized in bulk in the presence of catalyst until the conversion reaches a value from 10 to 40% and a subsequent aqueous suspension polymerization process in which the reacted mixture is suspended and dispersed in an aqueous medium containing suspension stabilizer and the remaining monomer is substantially completely polymerized in the state of aqueous suspension. The present invention is based on the discovery that a procedure as described above makes it possible to control the size distribution of styrene-acrylonitrile copolymer far more readily than under conventional conditions of suspension polymerization or emulsion polymerization.

The present invention provides a satisfactorily economical process for producing styrene-acrylonitrile copolymer particles, in which genuinely spherical particles whose diameters are 0.833 mm. or greater (above 20 mesh by Tyler standard) amounts to 50% or more of the total weight of copolymer particles obtained.

The copolymerization process of the present invention substantially comprises two steps: the preliminary bulk polymerization and the succeeding aqueous suspension copolymerization. The value of final conversion in the preliminary bulk step, from 10 to 40%, in advance of the subsequent aqueous suspension step has a critical significance. If the final conversion in the preliminary bulk step is less than 10%, the enlargement of the diameter, which is one of the objects of the present invention, is not expected. On the other hand, if the conversion exceeds 40%, the high viscosity of the product makes it difficult to disperse same into an aqueous phase sufficiently. The two-step polymerization process of the present invention is preferably carried out by providing individual reactors appropriate for the respective steps.

The first step—bulk copolymerization—is carried out in the following manner. A mixture of 50 to 90 parts of styrene monomer and 10 to 50 parts of acrylonitrile monomer, preferably a mixture of 65 to 80 parts of styrene monomer and 20 to 35 parts of acrylonitrile monomer, is further mixed with 0.1 to 0.5% by wt. (per total monomer) of oil-soluble organic peroxides (polymerization catalyst) such as benzoyl peroxide, lauroyl peroxide, caproyl peroxide, cyclohexanone peroxide, dicumyl peroxide, di-tertiarybutylperoxide, tertiarybutyl hydroperoxide, etc., and 0.1 to 1.0% by wt. (per total monomer) of alkyl mecaptans (chain-transfer agent) such as lauryl mercaptan, tertiary dodecyl mercaptan, nonyl mercaptan, etc., and then is polymerized in an inert atmosphere such as nitrogen and carbon dioxide at a temperature from 50° to 100° C., preferably from 70° to 90° C., until a conversion of 10 to 40% is attained (partial polymerization in bulk).

The temperature of the preliminary polymerization must be neither below 50° C. where the rate of reaction is so small as not to be practical nor above 100° C. where pressure is created in the reactor and the reaction proceeds too vigorously to control.

The apparatus for the preliminary bulk step may be of any type, provided that it is equipped with a system serving to remove the heat of bulk polymerization. Among them, however, the polymerization reactor described in U.S. Ser. No. 694,253 (FIG. 1 or FIG. 2), now abandoned, the Crawford & Ruessell type of reactor (Chemical Engineering, vol. 11, No. 9, p. 63 (1966); Kagahu-Kojo, vol. 9, No. 3, p. 20 (1965)) are particularly suitable. The viscosity of the reaction product at the end of the step generally ranges from about 1 to 15 poises (converted into 30° C.).

For the second step—the aqueous suspension polymerization—conventional apparatus for suspension polymerization may be employed. In this step of the reaction, the resultant mixture of the first step, comprising the desired composition of polymer and monomer, is dispersed in an aqueous medium containing suspension-stabilizer (dispersing agent) under effective stirring. The temperature is not limited but is preferably chosen to be below the boiling point of acrylonitrile (78° C.).

The suspension-stabilizer for the present purpose is usually chosen from the known inorganic dispersion agents which are only slightly soluble in water such as carbonates, hydroxides, phosphates and sulfates of alkaline earth metals. If necessary, these inorganic dispersion agents may be used in combination with a small quantity of surfactant or there may be used water-soluble polymer such as polyvinylalcohol and partial sodium salt of polyacrylic acid (which combinations are called complex dispersing agents).

In a preferred embodiment of the present invention, the amount of suspension-stabilizer is 1–10% by weight based on the total monomer and the amounts of the surfactant and water-soluble polymer respectively amount to 0.001–0.01% and 0.002–0.05% by weight of the inorganic dispersing agent and ratio of the amount of water to that of total monomer is taken to be 0.5–1.5 of monomer per l. of water.

The partially polymerized mixture of monomer and polymer, suspended in water phase, is further polymerized in an inert atmosphere at a temperature suitable for the catalyst chosen, namely 50–150° C., preferably 60–120° C., until substantially all of the monomer is converted into polymer, after which the temperature is elevated to around 80–120° C., if necessary, to remove the remaining unreacted monomer out of the reaction system to complete the reaction substantially.

The spherical particles of copolymers obtained are washed at first with acid, then with water and dried. The particles are then sieved into several fractions having uniform size distributions, in which the average diameters differ from one fraction to another. Each fraction is used as a raw material for making porous products of a variety of pore sizes for various uses.

Among them, the fraction composed of uniform particles of styrene-acrylonitrile copolymer whose average diameter exceeds 0.833 mm. gives a rigid porous product having less possibility of choking and having the aforementioned balanced properties. Such a porous product is ideally suited for many purposes such as air-through tubes and air-through plates for the aeration treatment of sewerage and excrement and the treatment of industrial wastes, industrial filtering materials for coarse filtration of air and saline water (pretreatment in ino-exchange membrane process), etc. Thus, the present invention, which can provide a process for producing easily considerably large sizes of genuinely spherical copolymer as raw materials for such porous product, has a great significance in industry.

Furthermore, the larger-sized (above 0.833 mm.) particles of the present invention have the advantage that they can be directly fed to a molding machine without passing through an extruder (namely without converting them to pellets) and used to make the desired molded articles.

The following examples will further illustrate the invention but are not to be considered as limitations thereof.

EXAMPLE 1

A 120 l. polymerization vessel equipped with a stirrer, which was designed for removing rapidly the heat of polymerization reaction (disclosed in U.S. Ser. No. 694,253), was thoroughly filled with nitrogen and was charged with a mixture which had been prepared by completely dissolving 180 g. of lauroyl peroxide and 150 g. of tertiary-dodecyl mercaptan in a monomer mixture composed of 42 kg. of styrene and 18 kg. of acrylonitrile. Then the temperature in the vessel was raised to 70° C., at which the materials polymerized until the conversion reached 29.1%.

Another reactor of 180 l. capacity equipped with anchor-shaped stirring blades and baffle plates for facilitating dispersion of the high viscosity substances, filled with nitrogen, was charged with 500 g. of calcium triphosphate and 70 l. of water containing 0.01 g. of sodium lauryl sulfate.

The product of the above preliminary bulk copolymerization (viscosity: about 10 poises at room temperature) was added to said aqueous medium stirred at a velocity of 100 r.p.m. with the stirrer at about 60° C. to obtain a suspension. Then, the temperature in the reactor was raised up to 70° C., at which the materials polymerized for about 5 hours, after which the inner temperature was further raised up to 110° C. gradually, removing the unreacted monomer out of the polymerization system,to complete the reaction substantially.

After the reaction, the polymer obtained was washed with acid in order to dissolve the suspension-stabilizer, washed with water and then dried, by means of well-known conventional procedures.

EXAMPLE 2

The procedure of Example 1 was repeated except that 43.2 kg. of styrene and 16.8 kg. of acrylonitrile were preliminarily polymerized until 36.5% of the monomer was converted to polymer and that 0.04 g. of sodium lauryl sulfate was added to the aqueous medium.

EXAMPLE 3

The procedure of Example 1 was repeated except that 45 kg. of styrene and 15 kg. of acrylonitrile were preliminarily polymerized until 25.5% of the monomer was converted and that 0.04 g. of sodium lauryl sulfate was added to the aqueous medium.

CONTROL 1

A mixture of styrene, acrylonitrile, polymerization catalyst and chain-transfer agent having the same composition as Example 1, without any preliminary bulk polymerization, was dropped into an aqueous medium which was kept under the same conditions as Example 1 at a rate of 20 l./min. and dispersed to form a suspension. Then the temperature was elevated to 70° C. and kept at this temperature for about 8 hours in order to conduct the polymerization reaction, after which the procedures as in Example 1 were followed.

The particle size distributions and physical properties of the styrene-acrylonitrile copolymers obtained from the above Examples 1, 2, 3 and Control 1 are shown in Table 1.

The styrene-acrylonitrile particles obtained from Examples 1, 2 and 3 were sieved into fractions and fractions having diameters greater than 0.833 mm. (20 mesh or greater by Tyler standard) were packed into appropriate molds and treated at about 225° C. for 1 hour to sinter the particles by point-to-point adhesion. By this procedure porous plates were obtained which indicated greatly improved air-through resistance and mechanical strengths.

TABLE 1

| (1) Particle size distribution (Tyler standard sieve) | Example 1 | Example 2 | Example 3 | Control 1 |
|---|---|---|---|---|
| Percent | | | | |
| Not passing through 10 mesh (more than 1.651 mm.) | 12 | 4 | 10 | 0 |
| 10-16 mesh (1.651-0.991 mm.) | 20 | 72 | 15 | 0 |
| 16-20 mesh (0.991-0.833 mm.) | 31 | 12 | 29 | 2 |
| 20-30 mesh | 20 | 10 | 30 | 3 |
| Passing through 30 mesh | 17 | 2 | 16 | 95 |
| Particles passing through 30 mesh | | | | |
| 30-40 mesh | | | | 10 |
| 40-60 mesh | | | | 45 |
| 60-100 mesh (0.246-0.147 mm.) | | | | 11 |
| Passing through 100 mesh (less than 0.147 mm.) | | | | 29 |
| Ratio of particles greater than 20 mesh (percent) | 63 | 88 | 54 | 2 |

| (2) Physical properties | Example 1 | Example 2 | Example 3 | Control 1 |
|---|---|---|---|---|
| Tensile strength a (kg./cm.²) | 683 | 680 | 618 | 681 |
| Impact strength b (kg-cm./cm.²) | 3.3 | 3.1 | 2.8 | 3.5 |
| Thermal deformation temp.c (° C.) | 82.0 | 80.5 | 75.8 | 82.3 | a ASTM D638-61T.   b ASTM D256-56.   c ASTM D648-56.

The figures (mm.) in parenthesis following "mesh" indicate the interval of the sieve. The conversion between "mesh" and (mm.) were in accordance with the Kagaku Kogaku Binran (Handbook of Chemical Engineering) (Oct. 10, 1958), p. 882, Table 19.42.

EXAMPLE 4

The procedure of Example 1 was repeated twice with the final conversion of the preliminary bulk polymerization being 19.8% and 35.0% respectively. The particle size distributions are shown in Table 2. It is obvious from the table that the higher the preliminary conversion, the greater is the particle size of styrene-acrylonitrile copolymer.

TABLE 2

| Particle size distribution (Tyler standard sieve) | Final conversion of preliminary bulk polymerization | |
|---|---|---|
| | 19.8% | 35.0% |
| Not passing through 10 mesh (more than 1.651 mm.) | 10 | 3 |
| 10-16 mesh (1.651-0.991 mm.) | 12 | 65 |
| 16-20 mesh (0.991-0.833 mm.) | 29 | 14 |
| 20-30 mesh | 24 | 18 |
| Passing through 30 mesh | 25 | ca. 0 |
| Ratio of particles greater than 20 mesh (percent) | 51 | 82 |

The embodiments of the invention in which an exclusive property or privilege is claimed are defined as follows:

1. A process for producing genuinely spherical particles of styrene-acrylonitrile copolymers, which comprises the steps of (1) preliminarily bulk copolymerizing a monomer mixture composed of 50–90 parts by weight of styrene and 10–50 parts by weight of acrylonitrile, at a temperature in the range of from 50° C. to 100° C., in the presence of a polymerization catalyst with stirring of the mixture until from about 10–40% of the monomer mixture is converted to polymer, (2) dispersing the resulting reaction product of step (1) in an aqueous medium containing a suspension stabilizer to form a suspension, and (3) further polymerizing the remaining monomers in the suspension until they are substantially completely polymerized to form spherical particles of styrene-acrylonitrile copolymer, with at least 50% by weight of said particles having a diameter of 0.833 mm. or larger.

2. The process as claimed in claim 1, in which said monomer mixture is composed of 65–80 parts by weight of styrene and 20–35 parts by weight of acrylonitrile.

3. The process as claimed in claim 1, in which in step (1) said monomer mixture is preliminarily bulk copolymerized under an inert gas atmosphere.

4. The process as claimed in claim 3, in which in step (1) the monomer mixture is preliminarily bulk copolymerized at a temperature of 70–90° C.

5. The process as claimed in claim 3, in which said monomer mixture in step (1) contains a polymerization catalyst and a chain transfer agent.

6. The process as claimed in claim 5, in which said polymerization catalyst is an oil-soluble organic peroxide in the amount of 0.1–0.5% by weight based on the total monomers and said chain transfer agent is an alkyl mercaptan in the amount of 0.1–1.0% by weight based on the total monomers.

7. The process as claimed in claim 1, in which the step (3) is carried out at a temperature of 50–150° C. under an inert gas atmosphere.

8. The process as claimed in claim 1, in which the step (3) is carried out at a temperature of 60–120° C. under an inert gas atmosphere.

9. The process as claimed in claim 8, in which after the completion of step (3) the reaction product of step (3) is maintained at a temperature in the range of 80° C. to 120° C. to remove unreacted monomer from the reaction system.

10. The process as claimed in claim 7, in which the suspension stabilizer is selected from the group consisting of (1) inorganic dispersing agents (2) a mixture of an inorganic dispersing agent and a surfactant (3) a mixture of an inorganic dispersing agent and a water soluble polymer.

11. The process as claimed in claim 10, in which the amount of the suspension stabilizer is 1–10% by weight based on the total monomers and the amounts of said surfactant and said water soluble polymer are respectively 0.001–0.01% and 0.002–0.05% by weight based on said inorganic dispersing agent.

12. The process as claimed in claim 7, in which the weight ratio of the water in the suspension and the total monomers is 0.5–1.5 of the monomer to 1 of the water.

References Cited
UNITED STATES PATENTS 3,198,775   8/1965   Delacretaz et al.   260—85.5 R
3,202,641   8/1965   Nakajima et al.   260—85.5 HC
3,228,919   1/1966   Gatta et al.   260—85.5 R HARRY WONG, JR., Primary Examiner U.S. Cl. X.R.

260—2.5, 78, 91.1 R, 93.7, 93.3, 93.9